(12) United States Patent
Goto et al.

(10) Patent No.: US 6,492,611 B2
(45) Date of Patent: Dec. 10, 2002

(54) METHOD OF SURFACE TREATMENT USING ELECTRIC DISCHARGE AND AN ELECTRODE

(75) Inventors: Akihiro Goto, Tokyo (JP); Toshio Moro, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/822,026

(22) Filed: Mar. 30, 2001

(65) Prior Publication Data

US 2001/0013508 A1 Aug. 16, 2001

Related U.S. Application Data

(63) Continuation of application No. PCT/JP98/05111, filed on Nov. 13, 1998.

(51) Int. Cl.⁷ .............................. B23H 1/00; B05D 3/14
(52) U.S. Cl. .............................. 219/69.17; 219/69.15; 427/580
(58) Field of Search ................................ 427/540, 580; 219/69.15, 69.17

(56) References Cited

U.S. PATENT DOCUMENTS

| | | | | |
|---|---|---|---|---|
| 5,354,961 A | * | 10/1994 | Diot et al. ............... | 219/69.15 |
| 5,651,901 A | * | 7/1997 | Mohri et al. ............. | 219/69.17 |
| 5,698,114 A | * | 12/1997 | Magara et al. ........... | 219/69.17 |
| 5,804,789 A | * | 9/1998 | Saito et al. .............. | 219/69.17 |
| 6,184,486 B1 | * | 2/2001 | Diot et al. ............... | 219/69.17 |
| 6,348,668 B1 | * | 2/2002 | Moro et al. .............. | 219/69.17 |

FOREIGN PATENT DOCUMENTS

| | | |
|---|---|---|
| JP | 1-139774 | 6/1989 |
| JP | 8-53777 | 2/1996 |
| JP | 8-257841 | 10/1996 |
| JP | 8-300227 | 11/1996 |
| JP | 9-19829 | 1/1997 |
| JP | 9-108945 | 4/1997 |
| JP | 9-192937 | 7/1997 |
| JP | 10-6139 | 1/1998 |

* cited by examiner

*Primary Examiner*—Geoffrey S. Evans
(74) *Attorney, Agent, or Firm*—Sughrue Mion, PLLC

(57) ABSTRACT

In the discharge surface treatment method, an electrode having a cylindrical shape and a work are aligned face to face with a predetermined gap therebetween in a machining fluid. The electrode is a green compact electrode formed by compressing metal powder or powder of a metal compound or ceramics powder, or a metal electrode. A hard coat film of the material with which the electrode is made or a reactant of this material is formed on a surface of the work because of the energy generated during the electric discharge.

5 Claims, 5 Drawing Sheets

(a)

(b)

(c)

METHOD OF SURFACE TREATMENT USING ELECTRIC DISCHARGE AND AN ELECTRODE

This is a continuation of PCT/JP98/05111, filed Nov. 13, 1998.

TECHNICAL FIELD

The present invention in general relates to a method of surface treatment using electric discharge and an electrode used to obtain the electric discharge. More particularly, this invention relates to a method of surface treatment using electric discharge in which a gap discharge is carried out in a fluid.

BACKGROUND ART

A method of surface treatment using electric discharge (hereafter, discharge surface treatment method) is known. In the conventional method, a discharge in the form of pulses is generated between an electrode (hereafter, discharging electrode) and a work. The discharging electrode and the work are aligned face to face with a predetermined gap (hereafter, discharging gap) in a machining fluid. The discharging electrode is a green compact electrode or a metal electrode. The green compact electrode is the one that is formed by compressing metal powder or powder of a metal compound or ceramics powder. A hard coat film made of the material with which the electrode is formed (hereafter, electrode material) or its reactant is formed on the surface of the work (hereafter, work surface) because of the energy generated due to the electric discharge. This conventional method is disclosed in Japanese Patent Application Laid-Open gazettes (JP-A No. 8-300227, JP-A No. 9-19829 and JP-A No. 9-192937).

In conventional discharge surface treatment methods, a formed electrode is not used, but a solid discharging electrode having a simple shape that can be easily produced, such as a round rod-shaped electrode. The discharging electrode is made to scan the work surface.

However, when a discharging electrode having a shape of a round rod is used, as illustrated in FIG. 4(a), the length L of the electrode surface in the scanning direction is the longest in the electrode center portion and it is gradually shortened toward the sides. Therefore, when the discharging electrode passes by during scanning, an area through which the center portion passes has a longer time to face the discharging electrode, while another area through which a side portion passes has a shorter time to face the discharging electrode. For this reason, as illustrated in FIG. 4(b), the resulting coat film becomes thicker at the area through which the electrode center portion with the long length L of the electrode face passes, while it becomes thinner at the area through which the electrode side edge portion with a short length L of the electrode face passes, with the result that the electrode passage of only one time forms a levee shaped coat film c with variations in the film thickness, failing to form a coat film face with a uniform thickness.

When a coat film is formed along a straight line portion, a discharging electrode of a prismatic rod having a square shape in its cross-section maybe used. However, when, upon application of the prismatic rod discharging electrode, the scanning direction of the discharging electrode is changed, the orientation of the discharging electrode has to be rotated as in the case of spring processes, resulting in a difficult and time-consuming task.

Moreover, in the case of the discharging electrode of a round rod, upon carrying out the process on an edge portion of a mold, etc., the end face of the electrode is consumed as the process proceeds, with the result that, as illustrated in FIG. 5, the edge portion e of a work W is surrounded by the end face A of the electrode in such a manner that discharging is concentrated on the edge portion e, causing round edge corner portions with edge sagging.

In order to solve this problem, a method has been proposed in which the discharging electrode is rotated around the center axis line thereof; however, even if the discharging electrode is rotated, it is not possible to solve the problem of variations in the coat film thickness depending on the positions through which the discharging electrode passes.

Here, in a discharge coating method in which the tip of an electrode is allowed to slightly contact a work and the electrode material is transferred and fused to coat the work little by little through the discharging energy, a hollow pipe electrode is used as described in Japanese Patent Application Laid-Open gazettes (JP-A No. 8-53777 and JP-A No. 1-139774).

The present invention has been devised to solve the above-mentioned problems. It is an object of this invention to provide a discharge surface treatment method which can form a coat film with a uniform thickness in the discharge surface treatment method by using the gap-discharging process in a fluid, and which can also form a coat film without causing edge sagging, and also to provide a discharge surface treatment electrode used for such a discharge surface treatment method.

DISCLOSURE OF THE INVENTION

The method of the present invention, which is a discharge surface treatment method in which an electric discharge in the form of pulses is generated between an electrode and a work, the electrode and the work being aligned face to face with a predetermined gap therebetween in a machining fluid, the electrode being a green compact electrode formed by compressing metal powder or powder of a metal compound or ceramics powder, or a metal electrode, so that a hard coat film of the material with which the electrode is made or a reactant of this material is formed on a surface of the work because of the energy generated during the electric discharge, wherein the electrode is cylindrical in shape.

Because the electrode is cylindrical in shape, the length of the electrode face in the scanning direction is made virtually equal to each other between the electrode center portion and the electrode side edge portions. Accordingly, a coat film having virtually the same thickness at the electrode center portion and at the electrode side edge portions is formed so that a coat film surface having a uniform thickness can be formed. Moreover, since the electrode has cylindrical shape, different from a square shape, it does not have any directivity with respect to the scanning direction (shifting direction) Thus, it is not necessary to rotate the direction of the discharging electrode even when the scanning direction of the discharging electrode is changed.

Moreover, the present invention makes it possible to provide a discharge surface treatment method for forming a hard coat film while rotating the discharging electrode having the cylinder shape around its center axis line.

Therefore, the rotation of the discharging electrode around its center axis line allows the discharging electrode to be consumed in a uniform manner, thereby providing a uniform coat film thickness as well as preventing sagging at edge portions.

The electrode of the present invention, which electrode is used in a discharge surface treatment method in which an electric discharge in the form of pulses is generated between an electrode and a work, the electrode and the work being aligned face to face with a predetermined gap therebetween in a machining fluid, the electrode being a green compact electrode formed by compressing metal powder or powder of a metal compound or ceramics powder, or a metal electrode, so that a hard coat film of the material with which the electrode is made or a reactant of this material is formed on a surface of the work because of the energy generated during the electric discharge, wherein the electrode is cylindrical in shape.

Therefore, the length of the electrode face in the scanning direction is made virtually equal to each other between the electrode center portion and the electrode side edge portions; thus, a coat film having virtually the same thickness at the electrode center portion and at the electrode side edge portions is formed so that a coat film surface having a uniform thickness can be formed. Moreover, this discharging electrode has a cylinder shape so that, different from a square shape, it does not have any directivity with respect to the scanning direction (shifting direction); thus, it is not necessary to rotate the direction of the discharging electrode even when the scanning direction of the discharging electrode is changed.

BEST MODE FOR CARRYING OUT THE INVENTION

Figure 1:
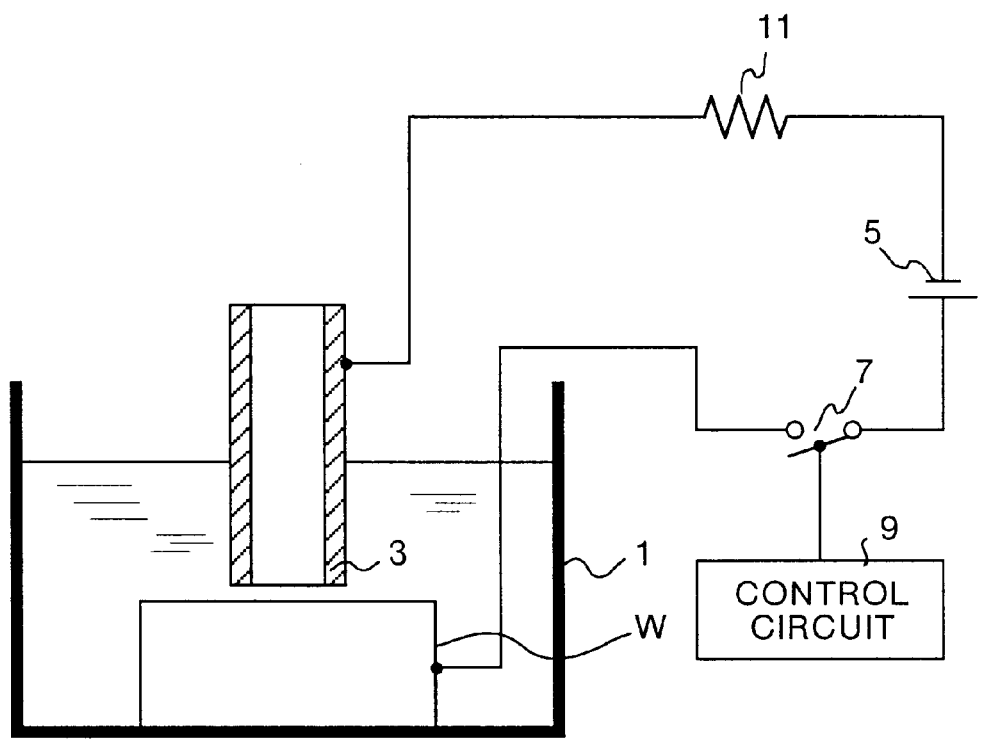
FIG. 1 is a schematic drawing that shows a discharge processing device used in a discharge surface treatment method in accordance with the present invention.

Preferred embodiment of the present invention will be explained in detail while referring to the drawings.

In FIG. 1, legend 1 denotes a processing vessel for storing a machining fluid such as oil or water etc. Legend 3 denotes a discharging electrode. The discharging electrode 3 has a cylindrical shape. Legend 5 denotes a power supply for applying a discharging voltage as pulses between the discharging electrode 3 and a work W placed in the processing vessel 1. Legend 7 denotes a switching element for carrying out switching between an electric current and the discharging voltage to be applied between the discharging electrode 3 and the work W. Legend 9 denotes a control circuit for controlling the ON and OFF of the switching element 7. Finally, legend 11 denotes a resistor.

In the discharge surface treatment using the gap-discharging process in a fluid, a known position control mechanism, not shown, which is provided in a normal discharge processing device, controls the gap between the discharging electrode 3 and the work W, that is, the discharging gap, to an appropriate gap (10 $\mu$m to several 10's $\mu$m) in the machining fluid, and applies a discharging voltage intermittently between the discharging electrode 3 and the work W so that a discharge in the form of pulses is generated between the discharging electrode 3 and the work W in water. Then, the discharging electrode 3 is consumed by the energy of the discharge, and the electrode consumable dissolving substance of the discharging electrode 3 is adhered and deposited on the surface of the work W so that a hard coat film, made of the electrode material or its reactant, is formed thereon.

The discharging electrode 3 is made of a green compact electrode formed by compressing and molding powder of metal powder, or powder of a metal compound, or powder of ceramics, into a cylinder shape, or a metal electrode having a cylinder shape. Specific examples include: a green compact electrode formed by compressing and molding powder in which TiN powder and Co powder are mixed into a cylinder shape, and a green compact electrode, which is formed by compressing and molding a powdered material containing a metal carbide, such as WC, TiC, TaC, ZrC, SiC, and VC, a nitride, such as TiN and ZrN, or a boride, such as $TiB_2$ and $ZrB_2$, into a cylinder shape.

Moreover, with respect to the discharging electrode 3, a green compact electrode, which is formed by compressing and molding power of hard metal such as Ti, Zr, V, and Ta or powder of a hydrogenated material of these, or a metal electrode, which is formed by any of these metals, is used, and a discharge processing oil containing HC is used as a machining fluid; thus, the electrode material and HC in the discharge processing oil are allowed to react to form a hard coat film made by a metal carbide, such as TiC, ZrC, VC and TaC.

Figure 2:
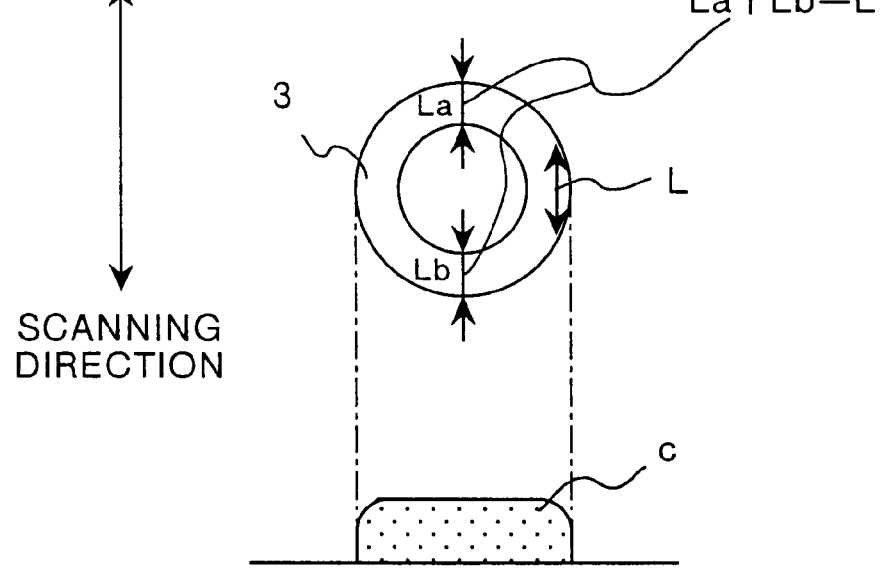
FIG. 2(a) and FIG. 2(b) are a longitudinal cross-sectional view and an end face view of a discharging electrode for discharge surface treatment.
FIG. 2(c) is a schematic cross-sectional view that shows a cross-section of a coat film formed by the discharge surface treatment method of the present invention.

As illustrated in FIGS. 2(a) and 2(b), the discharging electrode 3 has a cylinder shape, that is, a hollow pipe shape; therefore, the length of the electrode face L is virtually the same at the electrode center portion and at the electrode side edge portions. Consequently, a coat film c having virtually the same thickness at the electrode center portion and at the electrode side edge portions is formed, thereby making it possible to form a coat film surface having a uniform thickness.

Moreover, the discharging electrode 3 has a cylinder shape, with the result that, different from a square shape, it does not have any directivity with respect to the scanning direction (shifting direction); thus, it is not necessary to rotate the direction of the discharging electrode even when the scanning direction of the discharging electrode is changed.

The discharging electrode 3 having a cylinder shape is shifted so as to scan the work W, while being rotated around the center axis line thereof, so that a coat film is formed.

Figure 3:
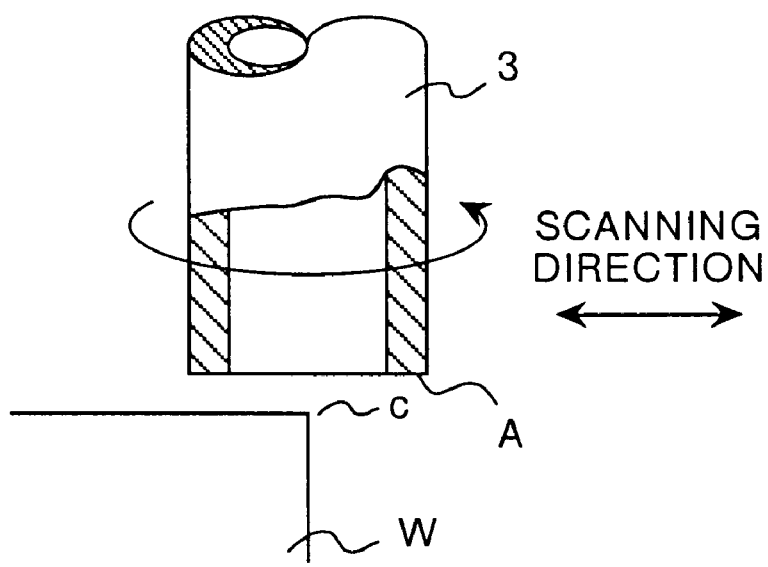
FIG. 3 is an explanatory drawing that shows a sequence of processes for carrying out the discharge surface treatment method of the present invention.
Figure 4:
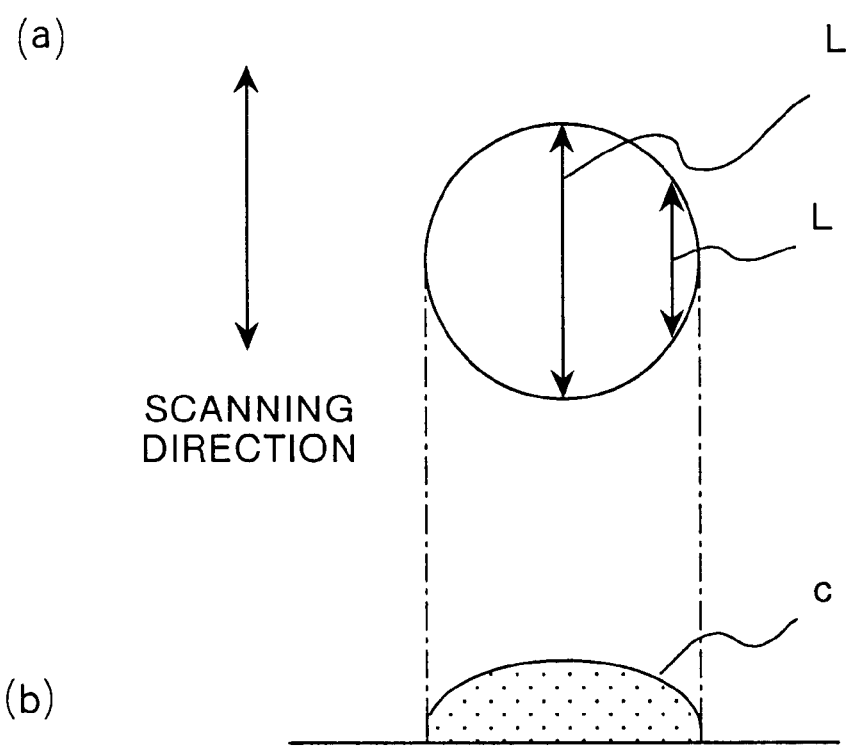
FIG. 4(a) is a cross-sectional view that shows a conventional discharging electrode.
FIG. 4(b) is a schematic cross-sectional view that shows a cross-section of a coat film formed by the conventional discharge surface treatment method.
Figure 5:
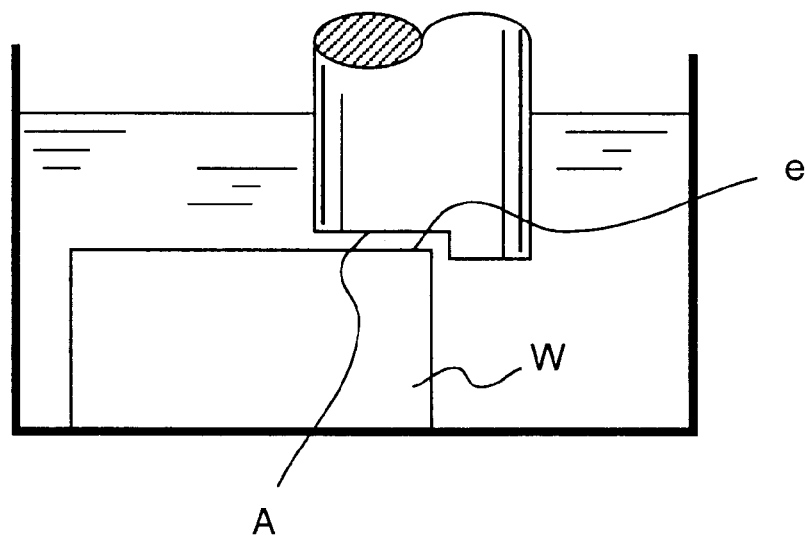
FIG. 5 is an explanatory drawing that shows a state of edges to which the conventional discharge surface treatment method has been applied.

In this case, as illustrated in FIG. 3, the rotation of the discharging electrode 3 around the center axis line thereof allows the discharging electrode to be consumed uniformly, so that it is possible to prevent the electrode end face A from surrounding the edge portion e of the work W, to avoid discharging from being concentrated on the edge portion e, and consequently to prevent the round edge corner portions with edge sagging.

Therefore, the combination of the discharging electrode 3 having a cylinder shape and the rotation of the electrode makes it possible to provide a uniform coat film thickness, and to prevent sagging at the edge portions.

INDUSTRIAL APPLICABILITY

The present invention makes it possible to form hard coat films on surfaces of various machine parts.

What is claimed is:

1. A discharge surface treatment method comprising generating an electric discharge in the form of pulses between an electrode and a work, the electrode and the work being aligned face to face with a predetermined gap therebetween in a machining fluid, the electrode being a green compact electrode formed by compressing metal powder or powder of a metal compound or ceramics powder, or a metal electrode, so that a hard coat film of the material with which the electrode is made or a reactant of this material is formed on a surface of the work because of the energy generated during the electric discharge, wherein the electrode is an unfilled hollow cylinder.

2. The discharge surface treatment method according to claim 1, further comprising rotating the electrode around an axis which extends parallel to the direction to which the unfilled hollow cylinder extends while generating the electrical discharge.

3. The discharge surface treatment method according to claim 1, wherein a longitudinal axis of the unfilled hollow cylinder is generally perpendicular to the surface of the work subject to treatment.

4. An electrode, which electrode is used in a discharge surface treatment method in which an electric discharge in the form of pulses is generated between an electrode and a work, the electrode and the work being aligned face to face with a predetermined gap therebetween in a machining fluid, the electrode comprising a green compact electrode formed by compressing metal powder or powder of a metal compound or ceramics powder, or a metal electrode, so that a hard coat film of the material with which the electrode is made or a reactant of this material is formed on a surface of the work because of the energy generated during the electric discharge, wherein the electrode is an unfilled hollow cylinder.

5. The electrode according to claim 4, wherein a longitudinal axis of the unfilled hollow cylinder is generally perpendicular to the surface of the work subject to treatment.

* * * * *